(12) United States Patent
Ushio et al.

(10) Patent No.: US 12,367,704 B2
(45) Date of Patent: *Jul. 22, 2025

(54) VEHICLE-MOUNTED DEVICE AND SERVER

(71) Applicant: Faurecia Clarion Electronics Co., Ltd., Saitama (JP)

(72) Inventors: Hiroe Ushio, Saitama (JP); Shingo Takei, Saitama (JP); Yuichiro Nakagawa, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 231 days.

This patent is subject to a terminal disclaimer.

(21) Appl. No.: 18/106,553

(22) Filed: Feb. 7, 2023

(65) Prior Publication Data

US 2023/0173921 A1 Jun. 8, 2023

Related U.S. Application Data

(63) Continuation-in-part of application No. 17/469,732, filed on Sep. 8, 2021.

(30) Foreign Application Priority Data

Sep. 9, 2020 (JP) .................................. 2020-151066
Mar. 4, 2022 (JP) .................................. 2022-033967

(51) Int. Cl.
*B60K 35/00* (2024.01)
*B60K 35/65* (2024.01)
(Continued)

(52) U.S. Cl.
CPC ............ *B60K 35/00* (2013.01); *G06V 40/161* (2022.01); *B60K 35/65* (2024.01); *B60K 35/81* (2024.01);
(Continued)

(58) Field of Classification Search
CPC ........ B60K 35/00; B60K 35/65; B60K 35/81; B60K 2360/21; B60K 2360/741; B60K 35/80; G06V 40/161; G06V 20/593
See application file for complete search history.

(56) References Cited

U.S. PATENT DOCUMENTS 9,439,065 B2 9/2016 Cho
2010/0216441 A1 8/2010 Larsson et al.
(Continued)

FOREIGN PATENT DOCUMENTS

JP 2016199124 A 12/2016
JP 2019022012 A 2/2019
(Continued)

OTHER PUBLICATIONS

Office action issued by the USPTO for parent U.S. Appl. No. 17/469,732 on May 15, 2024.
(Continued)

*Primary Examiner* — Kito R Robinson
*Assistant Examiner* — Tanya C Sienko
(74) *Attorney, Agent, or Firm* — REISING ETHINGTON PC

(57) ABSTRACT

A vehicle-mounted device installed in a vehicle comprising a mobile terminal communication unit that communicates with a mobile terminal located inside the vehicle, and a control unit that provides an interface for operating the vehicle-mounted device from the mobile terminal, wherein the control unit compares a vehicle interior image taken inside the vehicle interior with a facial image of the user of the mobile terminal and changes the interface provided to the mobile terminal based on the determined seating position of the user. The vehicle-mounted device further comprises a display unit, wherein the control unit causes the mobile terminal to display expanded display details on the display (Continued)

unit if the seating position is in a front seat, and causes the mobile terminal to display the same display details as those on the display unit if the seating position is other than one in a front seat.

6 Claims, 14 Drawing Sheets

(51) Int. Cl.
*B60K 35/81* (2024.01)
*G06V 40/16* (2022.01)

(52) U.S. Cl.
CPC .... *B60K 2360/21* (2024.01); *B60K 2360/741* (2024.01)

(56) References Cited

U.S. PATENT DOCUMENTS

| | | | |
|---|---|---|---|
| 2011/0208834 A1* | 8/2011 | Nagano | B60R 25/00 709/217 |
| 2017/0150252 A1 | 5/2017 | Trestain et al. | |
| 2017/0242148 A1* | 8/2017 | Yu | G06V 30/424 |
| 2019/0251973 A1* | 8/2019 | Kume | G06F 3/167 |
| 2020/0159217 A1 | 5/2020 | Yamashita et al. | |
| 2020/0249822 A1 | 8/2020 | Penilla et al. | |
| 2020/0314597 A1* | 10/2020 | Adachi | G06V 40/172 |
| 2021/0031754 A1* | 2/2021 | Sasaki | B62D 15/025 |
| 2021/0097315 A1 | 4/2021 | Carruthers et al. | |
| 2021/0117524 A1 | 4/2021 | McKell-Redwood et al. | |
| 2022/0073081 A1 | 3/2022 | Ushio et al. | |

FOREIGN PATENT DOCUMENTS

| | | |
|---|---|---|
| JP | 2019139582 A | 8/2019 |
| JP | 2020086744 A | 6/2020 |

OTHER PUBLICATIONS

"Selfie" (Wikipedia)—https://en.wikipedia.org/wiki/Selfie; Jun. 19, 2019 capture.

Office action issued by the Japanese Patent Office for counterpart application JP2020-151066 on Jan. 16, 2024.

Machine Translation of the office action issued by the Japanese Patent Office for counterpart application JP2020-151066 on Jan. 16, 2024.

"Server(computing)" from Wikipedia, downloaded from www.archive.org, Aug. 16, 2020(year: 2020).

Office action issued in U.S. Appl. No. 17/469,732 dated Jul. 26, 2023.

* cited by examiner

VEHICLE-MOUNTED DEVICE AND SERVER

CROSS REFERENCE TO RELATED APPLICATIONS

This is a continuation-in-part of application Ser. No. 17/469,732, filed Sep. 8, 2021, and claims priority from JP 2020-151066, filed Sep. 9, 2020, and JP 2022-033967, filed Mar. 4, 2022. The entire contents of all of these applications are incorporated herein by reference.

TECHNICAL FIELD

The present invention is related to a vehicle-mounted device and server.

BACKGROUND ART

An example of the background art is JP 2019-022012 A (Patent Document 1 below). The following description is provided in Patent Document 1:

"A mobile information terminal 2 has a function for transmitting ultrasonic waves. Three or more ultrasonic sensors are arranged inside the vehicle interior of a vehicle V, an ultrasonic wave receiving device that receives ultrasonic waves via these ultrasonic sensors is provided in the vehicle V. When each ultrasonic sensor has received ultrasonic waves transmitted by the mobile information terminal 2, a position detecting unit 12 acquires, for example, information indicating the propagation time of the ultrasonic waves from the mobile information terminal 2 to each of the ultrasonic sensors or information indicating the reception strength of the ultrasonic waves by each of the ultrasonic sensors from the ultrasonic wave receiving device. The position detecting unit 12 converts the propagation time or reception strength into distances and detects the position of the mobile information terminal 2 using triangulation."

[Patent Document 1] JP 2019-22012 A

SUMMARY

In order to detect the position of a mobile terminal using triangulation, Patent Document 1 requires the installation of multiple ultrasonic sensors inside the vehicle. Installing multiple sensors simply to detect the position of a mobile information terminal increases costs and makes retrofitting vehicles with a function to detect the positions of the mobile terminals difficult. One thing that is desired is different mobile terminal interfaces based on the position of the seats so that, for example, those in the front seats (driver's seat, front passenger seat) and the other seats can operate the vehicle-mounted device directly. However, because such an improvement in convenience requires a significant increase in costs, it has not become widely used in the market. Therefore, it is an object of the present invention to easily and accurately determine the position of a user in a vehicle interior and provide controls based on the position of the user.

The vehicle-mounted device according to the present invention is a vehicle-mounted device installed in a vehicle that comprises a mobile terminal communication unit that communicates with mobile terminals each accompanying its user located inside the vehicle, and a control unit that provides the mobile terminals with screen interfaces for operating the vehicle-mounted device from the mobile terminals, the screen interfaces are displayed on the mobile terminals and contents of screen interfaces are determined based on seating positions of the users. The seating positions of the users are identified by comparing a vehicle interior image of inside the vehicle captured by a camera connected to the vehicle-mounted device with preregistered facial images of the users of the mobile terminals.

The present invention is able to easily and accurately determine the position of a user in a vehicle interior and provide controls based on the position of the user.

DESCRIPTION OF EMBODIMENTS

An embodiment of the present invention will now be explained with reference to the drawings.

Figure 1:
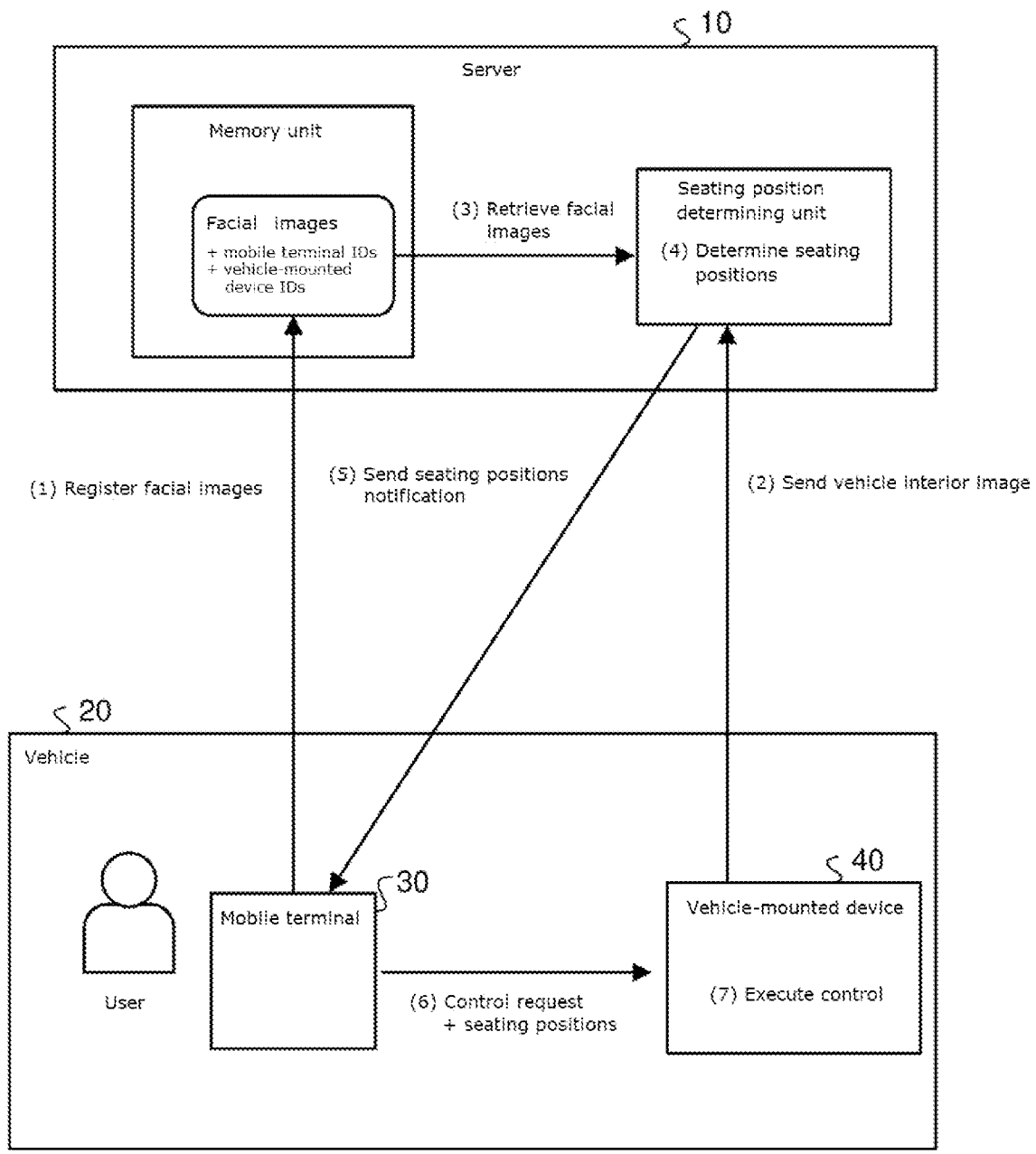
FIG. 1 is a diagram used to explain the vehicle-mounted control system in an embodiment of the present invention.

FIG. 1 is a diagram used to explain the vehicle-mounted control system in an embodiment of the present invention. The vehicle-mounted control system in this embodiment includes a mobile terminal 30 inside a vehicle 20, a vehicle-mounted device 40, and a server 10.

The mobile terminal 30 can be, for example, a smart phone that can communicate with the vehicle-mounted device 40 by short-range wireless communication to acquire the vehicle-mounted device ID, which is identification information on the vehicle-mounted device 40. When a predetermined application is launched inside the vehicle, the mobile terminal 30 is used to take a facial image of the user and register the facial image with the server 10 (1). At this time, the mobile terminal 30 sends a mobile terminal ID, which is identification information on the mobile terminal 30, and the vehicle-mounted device ID with the facial image to the server 10, and the server 10 associates and stores the mobile terminal ID and the vehicle-mounted device ID with the facial image. The vehicle-mounted device 40 can communicate a plurality of such mobile terminals 30.

The vehicle-mounted device 40 acquires a vehicle interior image and sends the vehicle interior image to the server 10 along with the vehicle-mounted device ID (2). If, for example, images captured for recording on a drive recorder include a vehicle interior image, that image can be used as the vehicle interior image.

When a vehicle interior image and a vehicle-mounted device ID are received from the vehicle-mounted device 40, the server 10 extracts the facial images associated and registered with the received vehicle-mounted device ID (3). The server 10 then performs facial recognition using the extracted facial images and the vehicle interior image. If a facial image that matches the face of a person in the vehicle interior image is identified, the server 10 determines the seating position of the person from the position in the vehicle interior image, and sets this as the seating position of the user of the mobile terminal 30 associated with the facial image (4). The server 10 then notifies the mobile terminal 30 of the seating position (5).

The mobile terminal 30 receives notification of the seating position from the server 10 and stores the position as the seating position of the user of the terminal itself. Afterward, when a control request is sent to the vehicle-mounted device 40 by the mobile terminal 30, the stored seating position can be specified (6).

When the vehicle-mounted device 40 receives a control request with a designated seating position from the mobile terminal 30, the vehicle-mounted device executes a control related to the designated seating position (7).

Specifically, the mobile terminal 30 can specify the seating position of the user and send a volume control request to the vehicle-mounted device 40. In this case, the vehicle-mounted device 40 controls the speaker so that the volume at the designated seating position satisfies the requested volume.

A control request with a designated seating position can be used not only for volume control but also for air conditioning control, seat angle control, locking/unlocking control, and interior lighting control, among others. It should be noted that the seating position does not have to be specified when a control request is sent from the mobile terminal 30 to the vehicle-mounted device 40, and this embodiment does not prevent the sending of control requests that do not require specification of a seating position.

In the vehicle-mounted control system shown in FIG. 1, the server 10 associates and stores a facial image of the user of a mobile terminal 30 with the mobile terminal ID, and performs facial recognition using a vehicle interior image and the facial image to determine the seating position of the user. Then, when a predetermined control request is received from the mobile terminal 30, the vehicle-mounted device 40 executes a control related to the seating position of the user of the mobile terminal 30. In this way, the present invention can easily and accurately determine the position of a user in a vehicle interior and provide controls based on the position of the user.

Figure 2:
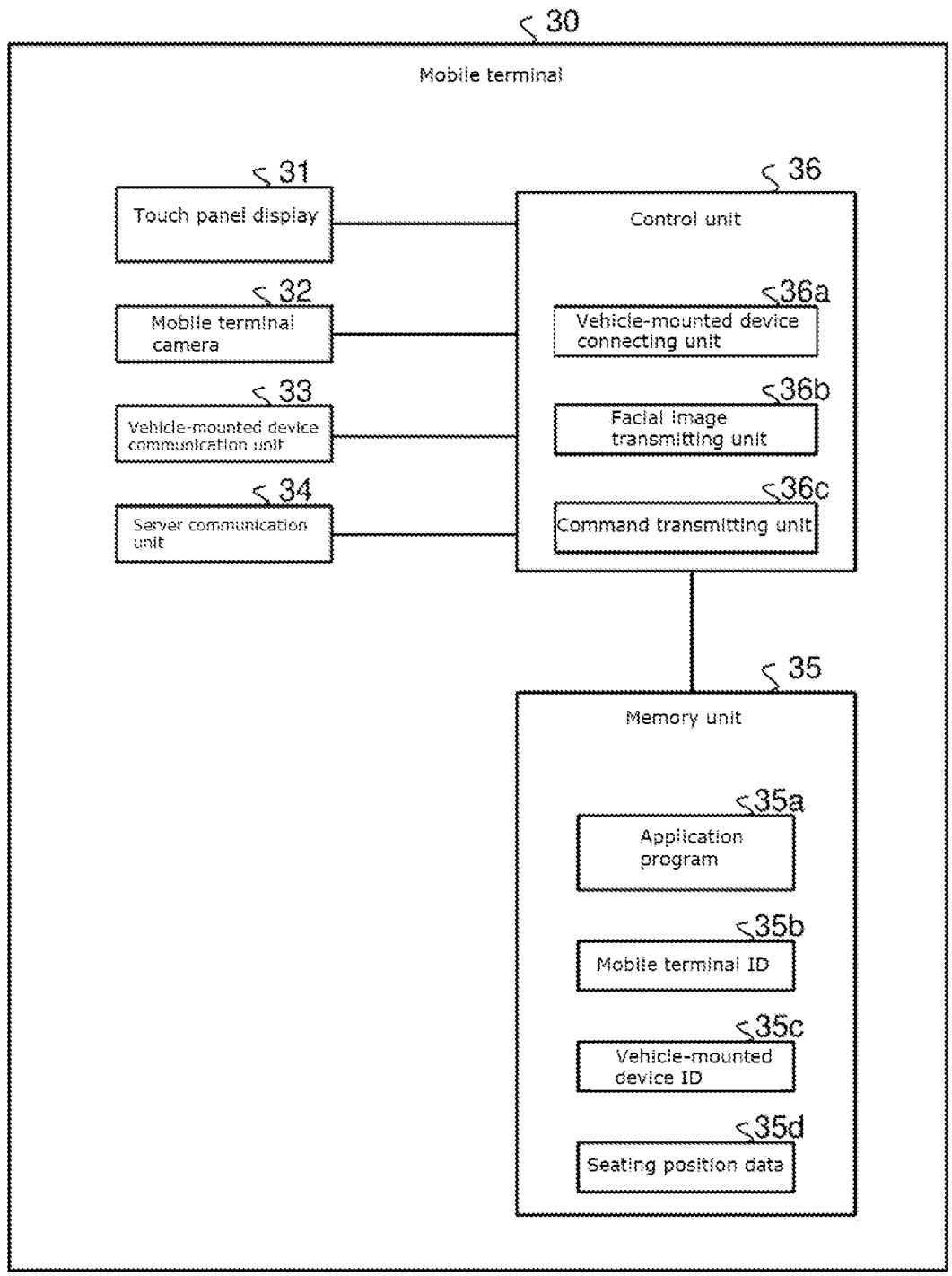
FIG. 2 is a diagram showing the configuration of a mobile terminal.

FIG. 2 is a diagram showing the configuration of a mobile terminal 30. The mobile terminal 30 can be, for example, a smartphone that has a touch panel display 31, a mobile terminal camera 32, a vehicle-mounted device communication unit 33, a server communication unit 34, a memory unit 35, and a control unit 36.

The touch panel display 31 is an input/output interface that receives input from the user and outputs display information. In this embodiment, the mobile terminal camera 32 is used to capture a facial image of the user. The vehicle-mounted device communication unit 33 is a communication interface that communicates with the vehicle-mounted device 40 by short-range wireless communication. Bluetooth (registered trademark), for example, may be used for short-range wireless communication. The server communication unit 34 is a communication interface that communicates with a server 10.

The memory unit 35 is a storage device such as flash memory. The memory unit 35 stores, for example, an application program 35a, a mobile terminal ID 35b, a vehicle-mounted device ID 35c, and seating position data 35d.

The application program 35a is executed by the control unit 36 to perform various functions. In this embodiment, the application program 35a realizes the functions of a remote control to request control of the vehicle-mounted device 40, in addition to capturing a facial image of the user and communicating with the server 10 for this purpose.

The mobile terminal ID 35b is unique identification information used to identify the mobile terminal 30. The vehicle-mounted device ID 35c is obtained from the vehicle-mounted device 40 and stored when short-range wireless communication has been established with the vehicle-mounted device 40. Because the vehicle-mounted device 40 is permanently installed in the vehicle 20, the vehicle-mounted device ID indicates the vehicle in which the mobile terminal 30 is located.

Seating position data 35d is data indicating the seating position received from the server 10. This seating position data 35d can be used to identify where in the vehicle the user of the mobile terminal 30 is seated. Specific examples of seating positions include the driver's seat, the front passenger's seat, the rear right seat, and the rear left seat.

The vehicle-mounted device ID 35c and the seating position data 35d are preferably deleted from the memory unit 35 when the user gets out of the vehicle and short-range wireless communication between the mobile terminal 30 and the vehicle-mounted device 40 is disconnected.

The control unit 36 can be, for example, a CPU (central processing unit) that realizes the remote control function of the vehicle-mounted device 40 by retrieving and executing the application program 35a. Specifically, by executing the application program 35a, the control unit 36 functions as a vehicle-mounted device connecting unit 36a, a facial image transmitting unit 36b, and a command transmitting unit 36c.

When the application program 35a has been launched, the vehicle-mounted device connecting unit 36a establishes communication with the vehicle-mounted device 40, acquires the vehicle-mounted device ID from the vehicle-mounted device 40, and stores the acquired vehicle-mounted device ID in the memory unit 35 as the vehicle-mounted device ID 35c.

After the application program 35a has been launched and the vehicle-mounted device ID has been acquired, the facial image transmitting unit 36b captures a facial image of the user with the mobile terminal camera 32 and transmits the facial image to the server 10 along with the mobile terminal ID 35b and the vehicle-mounted device ID 35c to request registration of the facial image. If a seating position has been received from the server 10, the facial image transmitting unit 36b stores the seating position data 35d indicating the received seating position in the memory unit 35.

The command transmitting unit 36c is a processing unit that receives an operation from the user, generates a control request, that is, a command, to be sent to the vehicle-mounted device 40, and sends the command to the vehicle-mounted device 40. The command transmitting unit 36c can send the seating position data 35d along with the command at this time.

Figure 3:
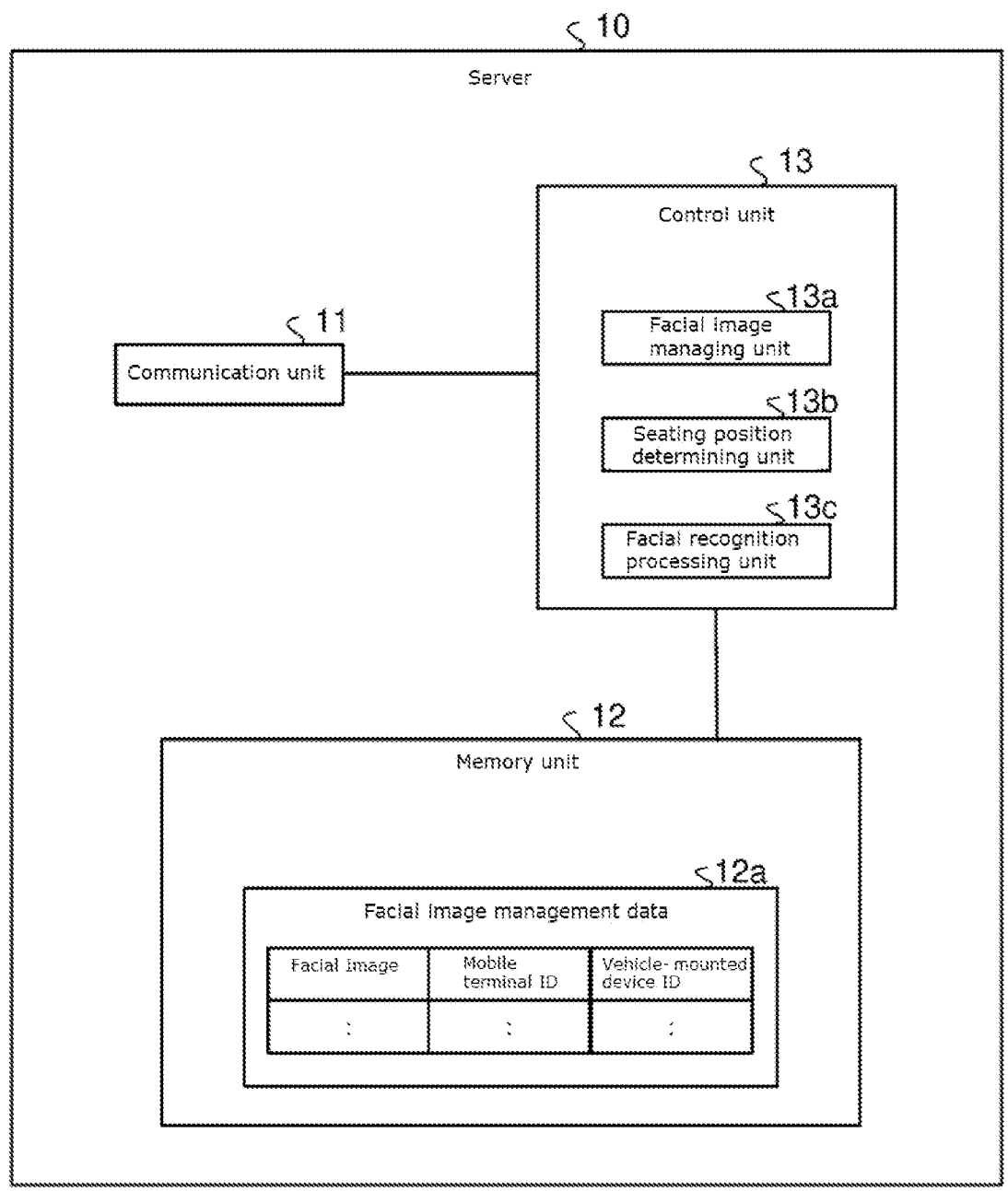
FIG. 3 is a diagram showing the configuration of a server.

FIG. 3 is a diagram showing the configuration of the server 10. As shown in FIG. 3, the server 10 has a communication unit 11, a memory section 12 and a control unit 13. The communication unit 11 is a communication interface that communicates with a mobile terminal 30 and a vehicle-mounted device 40.

The memory unit 12 is a storage device such as a hard disk drive or flash memory that stores facial image management data 12a. In facial image management data 12a, a facial image received from a mobile terminal 30 is associated and registered with a mobile terminal ID and a vehicle-mounted device ID.

The control unit 13 can be, for example, a CPU that operates as a facial image managing unit 13a, a facial recognition processing unit 13b, and a seating position determining unit 13c when a predetermined program is executed. When a facial image, mobile terminal, and vehicle-mounted device ID are received from a mobile terminal 30, the facial image managing unit 13a associates the facial image with the mobile terminal ID and the vehicle-mounted device ID, and stores the associated information in the facial image management data 12a.

When a vehicle interior image and a vehicle-mounted device ID have been received from the vehicle-mounted device 40, the facial recognition processing unit 13b extracts the facial image associated and registered with the vehicle-mounted device ID from the facial image management data 12a, and performs facial recognition using the extracted facial image and vehicle interior image.

When the facial recognition processing unit 13b has determined that the facial image matches the face of a person in the vehicle interior image, the seating position determining unit 13c determines the seating position from the position in the vehicle interior image, and sets this as the seating position of the user of the mobile terminal 30 associated with the facial image. The seating position determining unit 13c then notifies the mobile terminal 30 of the seating position.

Figure 4:
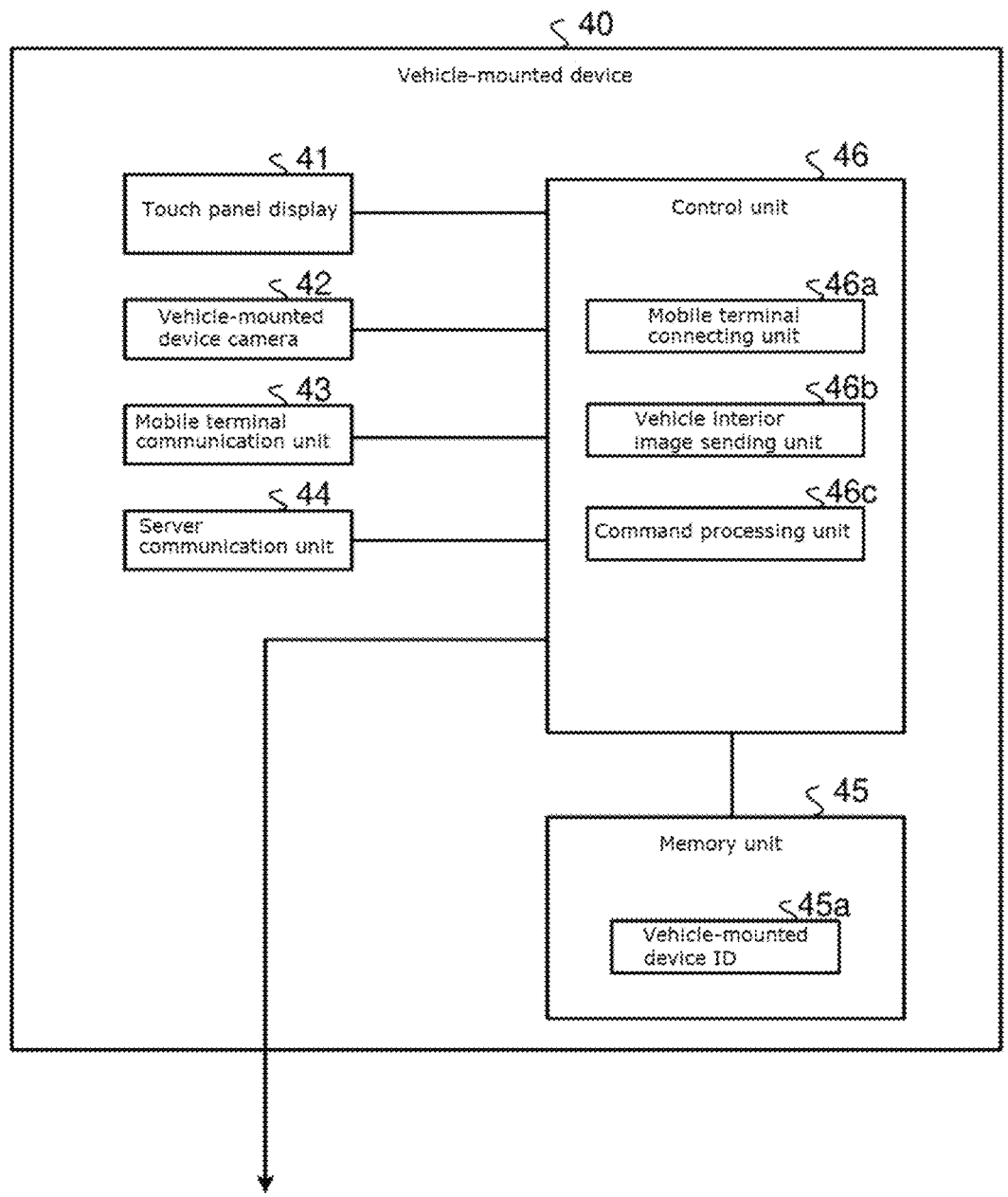
FIG. 4 is a diagram showing the configuration of a vehicle-mounted device.

FIG. 4 is a diagram showing the configuration of the vehicle-mounted device 40. The vehicle-mounted device 40 has a touch panel display 41, a vehicle-mounted device camera 42, a mobile terminal communication unit 43, a server communication unit 44, a memory unit 45, and a control unit 46.

The touch panel display 41 is an input/output interface that receives input from the user and outputs display information. The vehicle-mounted device camera 42 is a camera that can be used to capture vehicle interior images. The camera for the drive recorder is preferably used as this camera. In other words, the vehicle-mounted device 40 may function as a drive recorder and may be configured so that the vehicle-mounted device camera 42 is shared with the drive recorder. The mobile terminal communication unit 43 is a communication interface that connects to and communicates with a mobile terminal 30 by short-range wireless communication. The server communication unit 44 is a communication interface used to communicate with the server 10.

The memory unit 45 is a storage device such as flash memory. The memory unit 45 stores the vehicle-mounted device ID 45a, etc. The vehicle-mounted device ID 45a is unique identification information used to identify the vehicle-mounted device 40.

The control unit 46 can be, for example, a CPU that retrieves and executes a predetermined program to provide a mobile terminal connecting unit 46a, a vehicle interior image transmitting unit 46b, and a command processing unit 46c.

The mobile terminal connecting unit 46a performs processing to establish communication with a mobile terminal 30 and send the vehicle-mounted device ID 45a to the mobile terminal 30.

The vehicle interior image transmitting unit 46b is a processing unit that transmits a vehicle interior image captured by the vehicle-mounted device camera 42 along with the vehicle-mounted device ID 45a to a server. A vehicle interior image may be transmitted, for example, periodically at regular intervals.

The command processing unit 46c is a processing unit that executes commands received from mobile terminals 30. Specifically, the command processing unit 46c can execute commands related to, for example, volume control, air conditioning control, seat angle control, locking/unlocking, and interior lighting control. Commands are executed by controlling operations of the speakers, air conditioner, seat angle adjusting mechanisms, locking mechanisms, and interior lighting devices installed in the vehicle 20. When a seating position is received with a command at this time, the command processing unit 46c controls operation of various devices to satisfy the command from the received seating position.

Figure 5:
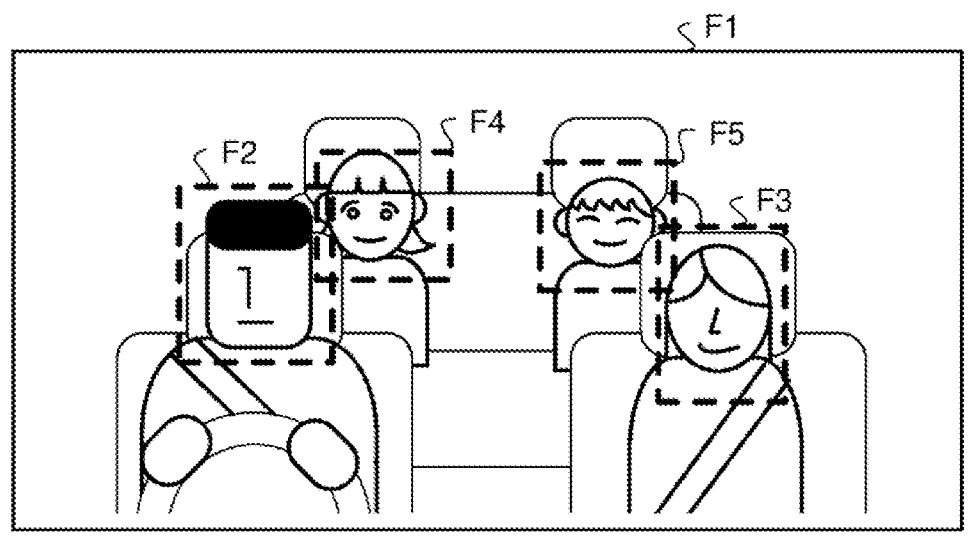
FIG. 5 is a diagram used to explain a specific example of a vehicle interior image.

FIG. 5 is a diagram used to explain a specific example of a vehicle interior image. In FIG. 5, the vehicle interior image F1 includes the facial images of multiple persons. Partial image F2 of the vehicle interior image F1 includes the facial image of the person sitting in the driver's seat, and partial image F3 includes the facial image of the person sitting in the front passenger's seat. Similarly, partial image F4 includes the facial image of the person seated in the rear right seat, and partial image F5 includes the facial image of the person seated in the rear left seat.

Because the vehicle-mounted device camera 42 is permanently installed in the vehicle 20, the positions in partial images F2 to F5 of the vehicle interior image F1 correspond to the seating positions. Therefore, if a person in the vehicle interior image F1 is identified using facial recognition, the seating position of the person can be determined based on the position where the image of the person's face is located in the vehicle interior image F1.

Figure 6:
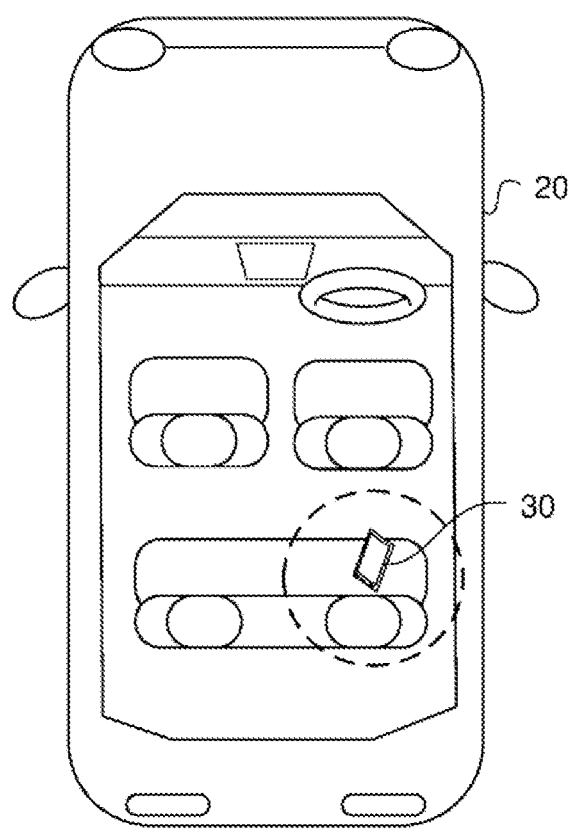
FIG. 6 is a diagram used to explain seating position-based controls.

FIG. 6 is a diagram used to explain seating position-based controls. In FIG. 6, the seating position of the user of the mobile terminal 30 is the rear right seat of the vehicle 20. When the mobile terminal 30 transmits a command requesting a certain volume level along with the seating position, the in-vehicle speakers will be controlled so that the volume level in the command is realized around the rear right seat. For the sake of convenience, FIG. 6 shows a situation in which the position of the mobile terminal 30 matches the seating position of the user. Because the mobile terminal 30 sends the seating position of the user, controls can be performed at the seating position of the user even when the position of the mobile terminal 30 and the seating position of the user are different.

Figure 7:
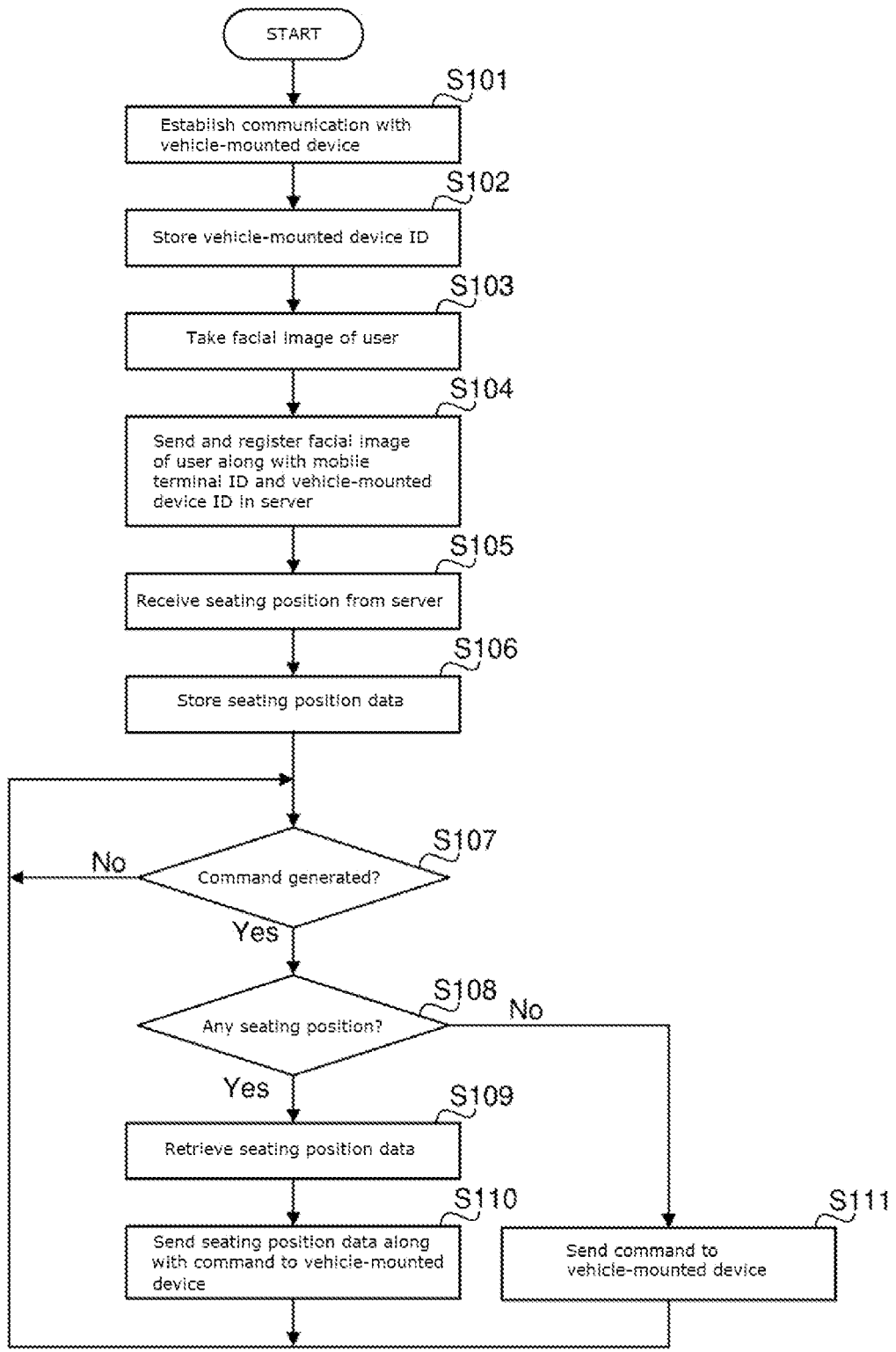
FIG. 7 is a flowchart showing processing steps performed by a mobile terminal.

FIG. 7 is a flowchart showing processing steps performed by a mobile terminal 30. First, when the control unit 36 starts the application program 35a, the vehicle-mounted device connecting unit 36a establishes communication with the vehicle-mounted device 40 (step S101). Once communication has been established, the vehicle-mounted device connecting unit 36a acquires the vehicle-mounted device ID from the vehicle-mounted device 40, and stores this information in the memory unit 35 as the vehicle-mounted device ID 35c (step S102).

After the vehicle-mounted device ID has been acquired and stored, the facial image transmitting unit 36b captures a facial image of the user with the mobile terminal camera 32 (step S103), and sends the facial image to the server 10 along with the mobile terminal ID 35b and the vehicle-mounted device ID 35c to request registration of the facial image (step S104). When the seating position has been received from the server 10 (step S105), the facial image transmitting unit 36b stores the seating position data 35d indicating the received seating position in the memory unit 35 (step S106).

After step S106, the command transmitting unit 36c monitors for commands (step S107). A command is generated, for example, when an operation performed by the user is received. When no command has been generated (step S107; No), the command transmitting unit 36c repeats step S107.

When a command has been generated (step S107; Yes), the command transmitting unit 36c determines whether the command is dependent on seating position (step S108). If the command is not dependent on seating position (step S108; No), the command transmitting unit 36c transmits the generated command to the vehicle-mounted device 40 (step S111), and returns to step S107.

If the command is dependent on seating position (step S108; Yes), the command transmitting unit 36c retrieves seating position data 35d from the memory unit 35 (step S109), sends the command together to the vehicle-mounted device 40 along with the seating position data (step S110), and returns to step S107.

Figure 8:
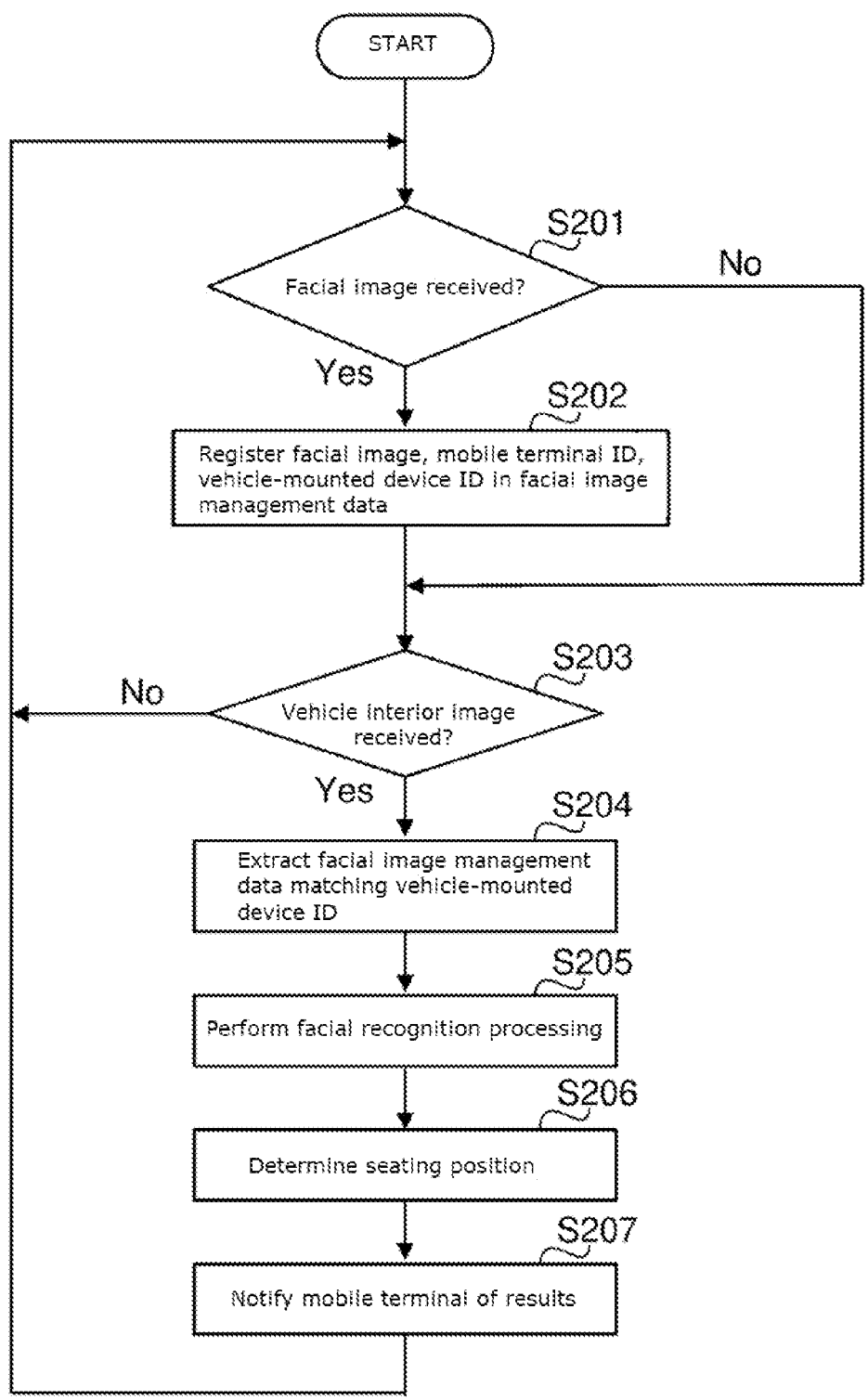
FIG. 8 is a flowchart showing processing steps performed by a server.

FIG. 8 is a flowchart showing processing steps performed by the server 10. The facial image managing unit 13a in the server 10 determines whether or not a facial image has been received from the mobile terminal 30 (step S201). If a facial image has been received from the mobile terminal 30 (step S201; Yes), the facial image managing unit 13a associates the mobile terminal ID and the vehicle-mounted device ID with the facial image and registers the associated information in facial image management data 12a (step S202).

After step S202 or if no facial image has been received (step S201; No), the facial recognition processing unit 13b determines whether or not a vehicle interior image has been received from the vehicle-mounted device 40 (step S203). If a vehicle interior image has not been received (step S203; No), the processing returns to step S201.

If a vehicle interior image has been received (step S203; Yes), the facial recognition processing unit 13b extracts from the facial image management data 12a the facial image associated and registered with the vehicle-mounted device ID received together with the vehicle interior image (step S204), and performs facial recognition using the extracted facial image and the vehicle interior image (step S205).

After step S205, the seating position determining unit 13c determines the seating position from the position of the image of the person specified by face recognition in the vehicle interior image (step S206). The seating position determining unit 13c notifies the mobile terminal 30 of the seating position of the person identified by facial recognition (step S207), and returns to step S201.

Figure 9:
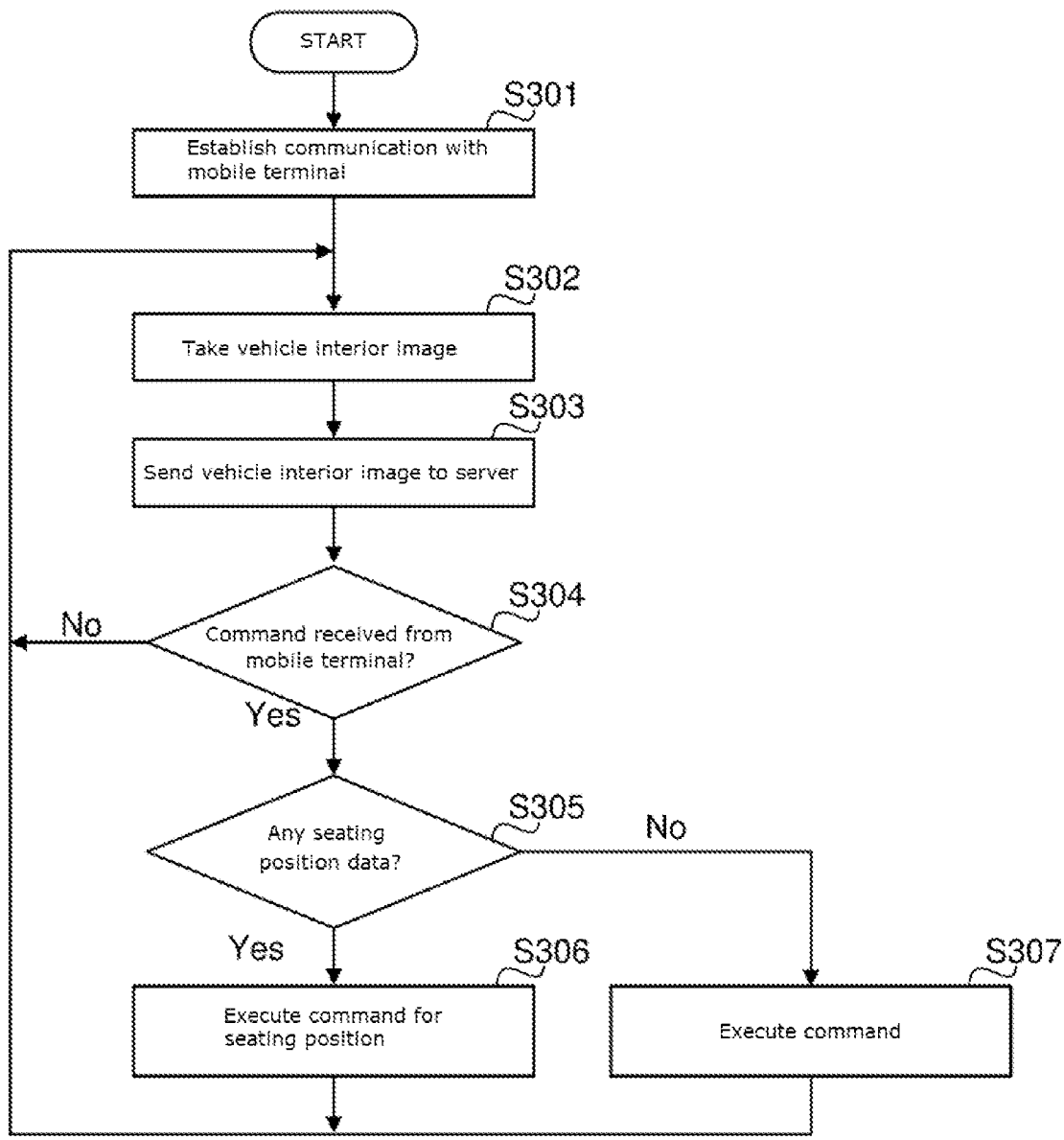
FIG. 9 is a flowchart showing processing steps performed by a vehicle-mounted device.

FIG. 9 is a flowchart showing processing steps performed by the vehicle-mounted device 40. The mobile terminal connecting unit 46a in the vehicle-mounted device 40 first establishes communication with a mobile terminal 30, and then transmits the vehicle-mounted device ID 45a to the mobile terminal 30 (step S301).

After step S301, the vehicle interior image transmitting unit 46b captures a vehicle interior image with the vehicle-mounted device camera 42 (step S302), and transmits the vehicle interior image along with the vehicle-mounted device ID 45a to a server (step S303).

The command processing unit 46c performs monitoring to determine whether or not a command has been received from the mobile terminal 30 (step S304). When no command has been received (step S304; No), the processing returns to step S302.

When a command has been received (step S304; Yes), the command processing unit 46c determines whether or not seating position data has been received along with the command (step S305). If seating position data has been received along with the command (step S305; Yes), the command processing unit 46c executes the command for the seating position (step S306) and returns to step S302. If seating position data has not been received along with the command (step S305; No), the command processing unit 46c executes the command (step S307) and returns to step S302.

In the example explained above, the server is configured to determine the seating position and the mobile terminal 30 stores the seating position. However, the present invention is not limited to this configuration, and many modifications are possible.

Modified Example 1

Figure 10:
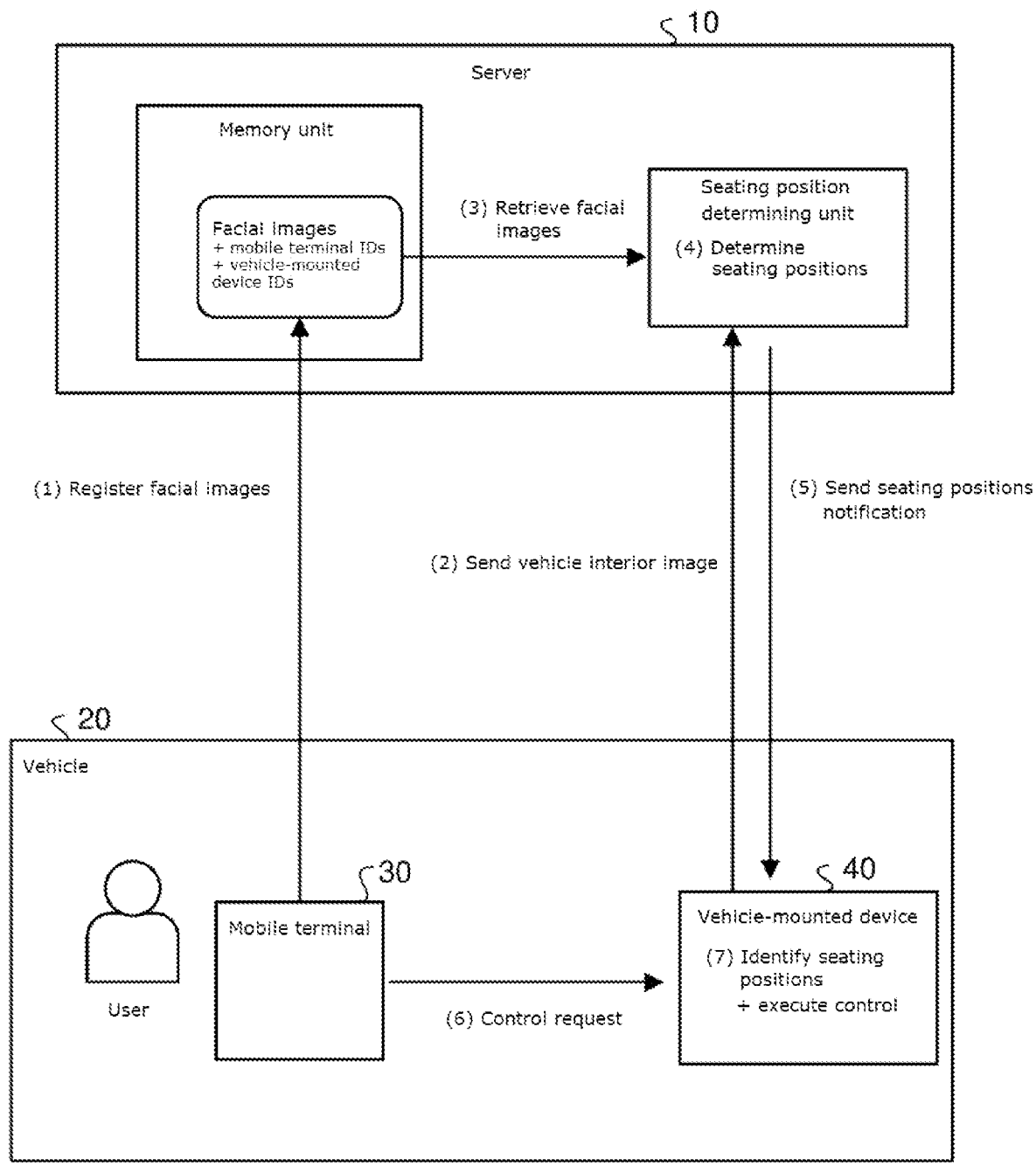
FIG. 10 is a diagram used to explain Modified Example 1.

FIG. 10 is a diagram used to explain Modified Example 1. In the vehicle-mounted device control system in Modified Example 1, a seat position determined by the server 10 is sent to the vehicle-mounted device 40, and the vehicle-mounted device 40 stores the seated position. The following is an explanation of the operations performed by the vehicle-mounted device control system in Modified Example 1.

First, the processing from registering a facial image (1) to determining the seating position (4) is the same as in FIG. 1. After determining the seating position, the server 10 notifies the vehicle-mounted device 40 of the mobile terminal ID associated with the facial image and the seating position (5). The vehicle-mounted device 40 receives the notification and associates and stores the seating position with the mobile terminal ID.

Afterward, the mobile terminal 30 sends a control request to the vehicle-mounted device 40 (6). Although the seating position cannot be specified directly when sending this control request, the mobile terminal can specify that "control is to be performed for the seating position of the user of the mobile terminal 30."

When a control request is received from the mobile terminal 30, the vehicle-mounted device 40 identifies the seating position of the mobile terminal 30 based on the mobile terminal ID, and executes the specified control (7). As a result, the vehicle-mounted device 40 can perform controls that target the seating position of the user of the mobile terminal 30.

Modified Example 2

Figure 11:
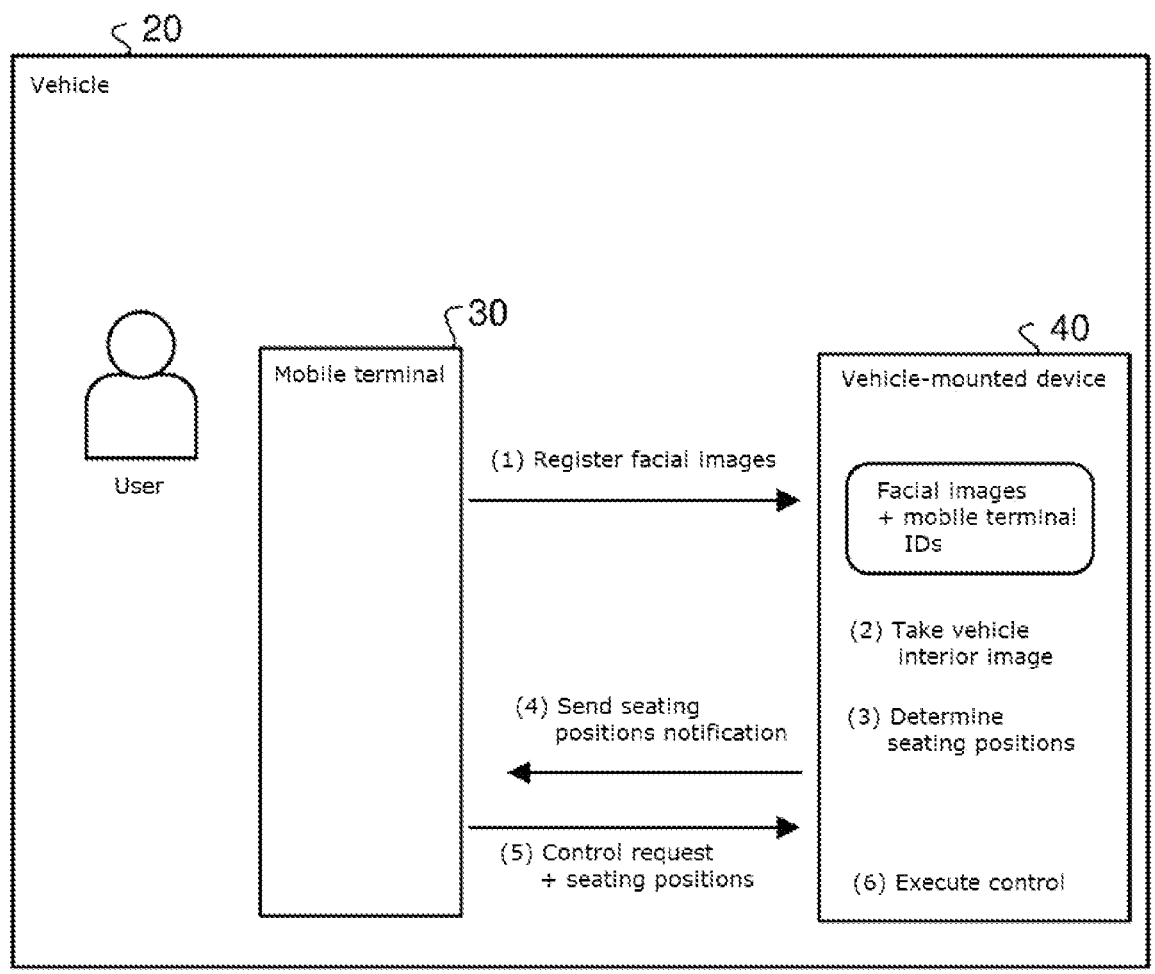
FIG. 11 is a diagram used to explain Modified Example 2.

FIG. 11 is a diagram used to explain Modified Example 2. In the vehicle-mounted device control system in Modified Example 2, a seat position is determined by the vehicle-mounted device 40 and the mobile terminal 30 stores the seated position. The following is an explanation of the operations performed by the vehicle-mounted device control system in Modified Example 2.

When a predetermined application is started in the vehicle, the mobile terminal 30 captures a facial image of the user and sends the facial image to the vehicle-mounted device 40 along with the mobile terminal ID to register the facial image (1). The vehicle-mounted device 40 associates and stores the facial image with the mobile terminal ID.

The vehicle-mounted device 40 periodically captures a vehicle interior image (2), and performs facial recognition using the stored facial image and the vehicle interior image. If a facial image that matches the face of a person in the vehicle interior image is identified, the vehicle-mounted device 40 determines the seating position of the person from the position in the vehicle interior image, and sets this as the seating position of the user of the mobile terminal 30 associated with the facial image (3). The vehicle-mounted device 40 then notifies the mobile terminal 30 of the seating position (4).

The mobile terminal 30 receives notification of the seating position from the vehicle-mounted device 40 and stores the position as the seating position of the user of the terminal itself. Afterward, when a control request is sent to the vehicle-mounted device 40 by the mobile terminal 30, the stored seating position can be specified (5).

When the vehicle-mounted device 40 receives a control request with a designated seating position from the mobile terminal 30, the vehicle-mounted device executes a control related to the designated seating position (6).

Modified Example 3

Figure 12:
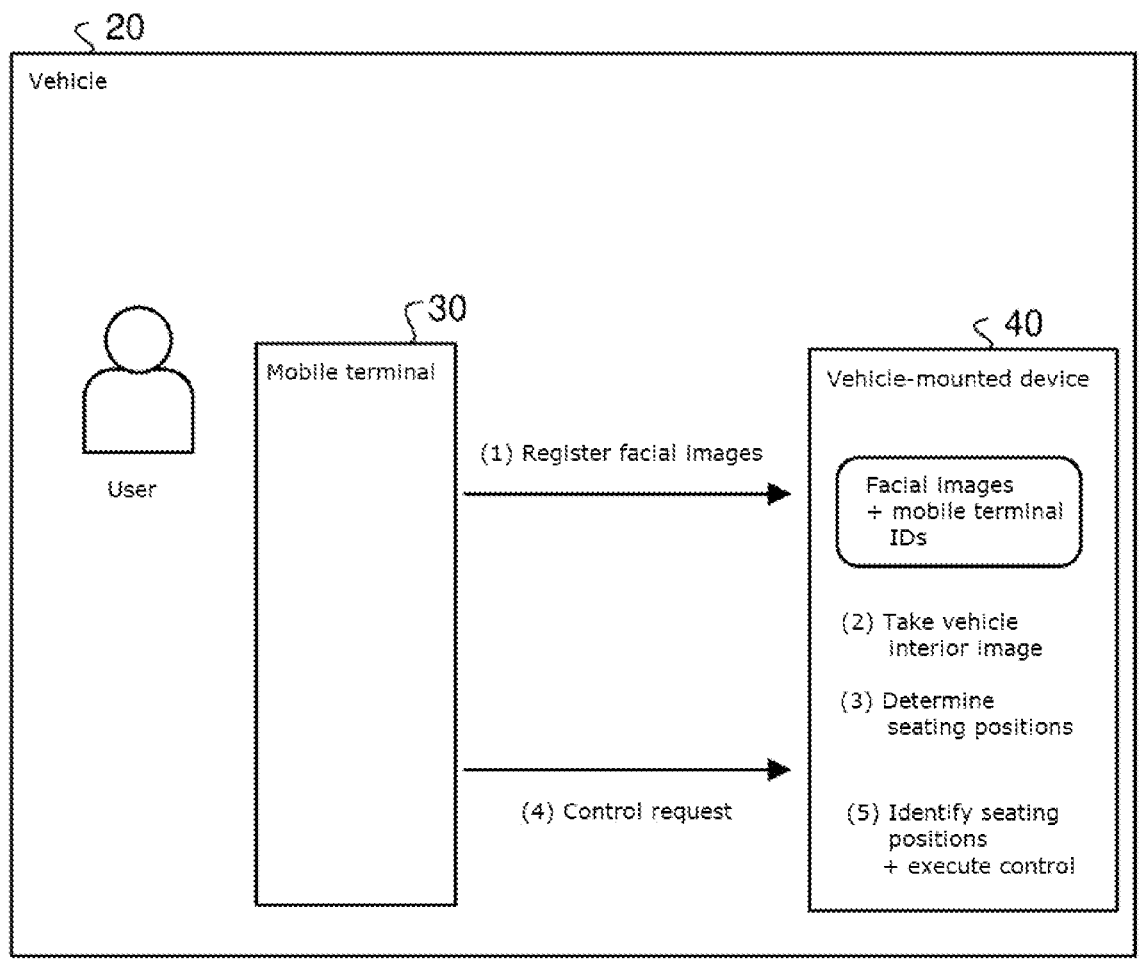
FIG. 12 is a diagram used to explain Modified Example 3.

FIG. 12 is a diagram used to explain Modified Example 3. In the vehicle-mounted device control system in Modified Example 3, a seat position is determined by the vehicle-mounted device 40 and stored. The following is an explanation of the operations performed by the vehicle-mounted device control system in Modified Example 3.

When a predetermined application is started in the vehicle, the mobile terminal 30 captures a facial image of the user and sends the facial image to the vehicle-mounted device 40 along with the mobile terminal ID to register the facial image (1). The vehicle-mounted device 40 associates and stores the facial image with the mobile terminal ID.

The vehicle-mounted device 40 periodically captures a vehicle interior image (2), and performs facial recognition using the stored facial image and the vehicle interior image. If a facial image that matches the face of a person in the vehicle interior image is identified, the vehicle-mounted device 40 determines the seating position of the person from the position in the vehicle interior image, and sets this as the seating position of the user of the mobile terminal 30 associated with the facial image (3). The vehicle-mounted device 40 then associates and stores the seating position with the mobile terminal ID of the mobile terminal 30.

Afterward, the mobile terminal 30 sends a control request to the vehicle-mounted device 40 (4). Although the seating position cannot be specified directly when sending this control request, the mobile terminal can specify that "control is to be performed for the seating position of the user of the mobile terminal 30."

When a control request is received from the mobile terminal 30, the vehicle-mounted device 40 identifies the seating position of the mobile terminal 30 based on the mobile terminal ID, and executes the specified control (5). As a result, the vehicle-mounted device 40 can perform controls that target the seating position of the user of the mobile terminal 30.

(Specific Example of Interfacing)

Figure 13:
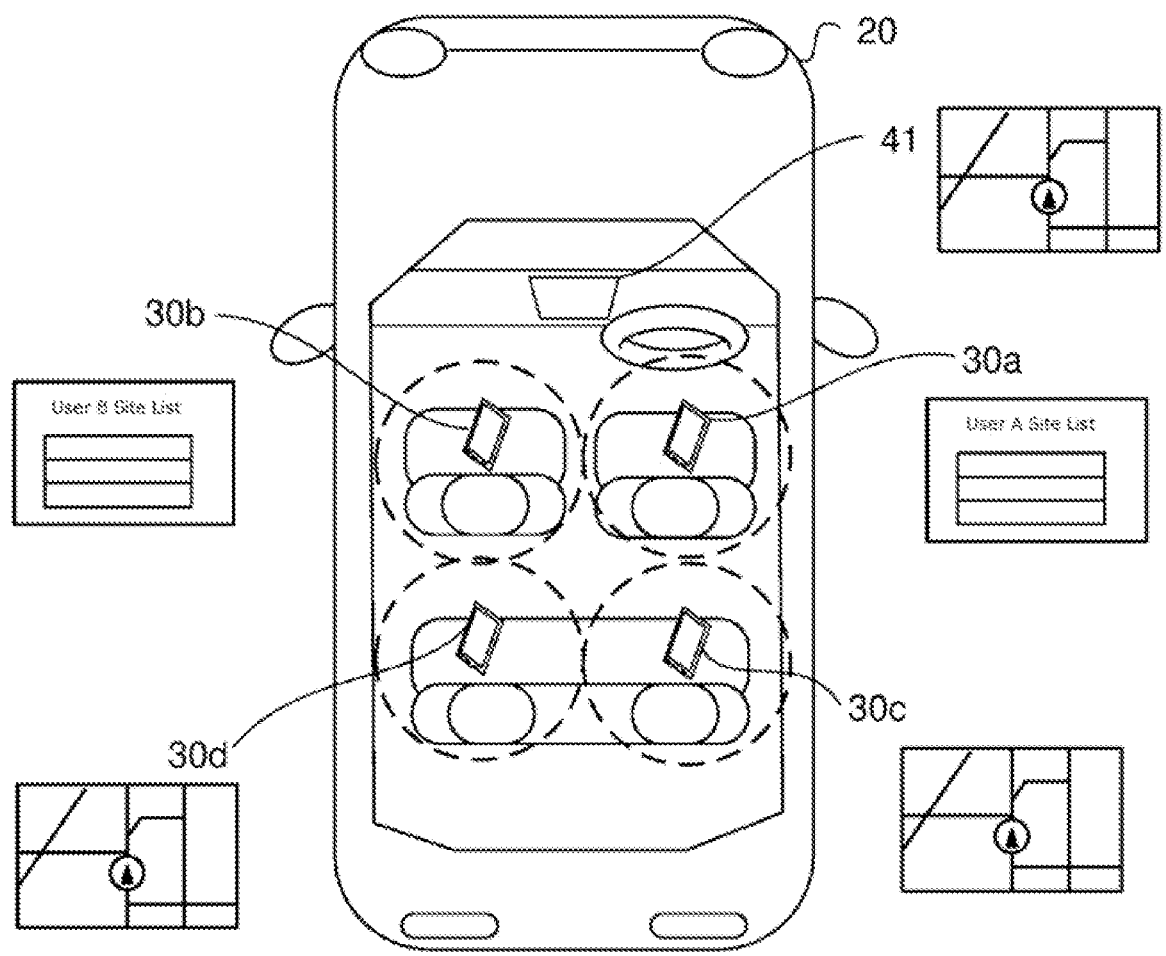
FIG. 13 is a diagram used to explain seating positions and what is displayed on mobile terminals.

The following is an explanation of a situation in which a specified seating position is used in interfacing between a mobile terminal and a vehicle-mounted device. FIG. 13 is a diagram used to explain seating positions and what is displayed on mobile terminals. The vehicle-mounted device 40 interfaces with the mobile terminals 30 so that operations for the vehicle-mounted device 40 can be received via mobile terminals 30. Here, different mobile terminal interfaces are desired for the front seats (driver's seat, front passenger seat) and the other seats so that they can directly operate the vehicle-mounted device.

In FIG. 13, a map is displayed on the touch panel display 41 of the vehicle-mounted device 40. Mobile terminal 30c and mobile terminal 30d located in the rear seats show the same display details as the touch panel display 41 when interfacing with the vehicle-mounted device 40. As a result, by using the display in the mobile terminals 30 as a substitute for the touch panel display 41, operations can be inputted to the vehicle-mounted device 40 even by passengers in the rear seats who cannot directly operate the touch panel display 41. For the sake of convenience, the process of displaying the same display details as those on the touch panel display 41 is referred to as "duplicating the display details."

When the mobile terminal 30a located in the driver's seat and the mobile terminal 30b located in the passenger's seat interface with the vehicle-mounted device 40, the display details on the touch panel display 41 are not duplicated. Instead, additional display details related to those appearing on the touch panel screen are displayed. Because the front seat occupants can directly operate the touch panel display 41, the touch panel display 41 and, for example, the mobile terminal 30a, which display different details, can be used to perform different operations. In this way, operability can be expanded for front seat occupants. For the sake of convenience, the process of displaying additional display details related to those appearing on the touch panel screen 41 is referred to as "expanding the display details."

Here, the mobile terminal 30a located in the driver's seat displays a "user A site list" as additional display details related to those appearing on the touch panel screen 41, and the mobile terminal 30b located in the front passenger's seat displays a "user B site list" as additional display details related to those appearing on the touch panel screen 41. These display details can be used, for example, to set destinations for a navigation system, and here each user is displaying a different candidate site list. In this way, when expanding the display details, the information associated with each user can be used to display different details. The information associated with each user can be, for example, a past travel history and sites entered and edited by the user. In this way, processing can be performed so that, for example, the mobile terminal 30a of user A displays a list prioritizing ramen shops, while the mobile terminal 30b of user B displays a list prioritizing cafes on the same map when displaying a list of candidate destination sites.

Figure 14:
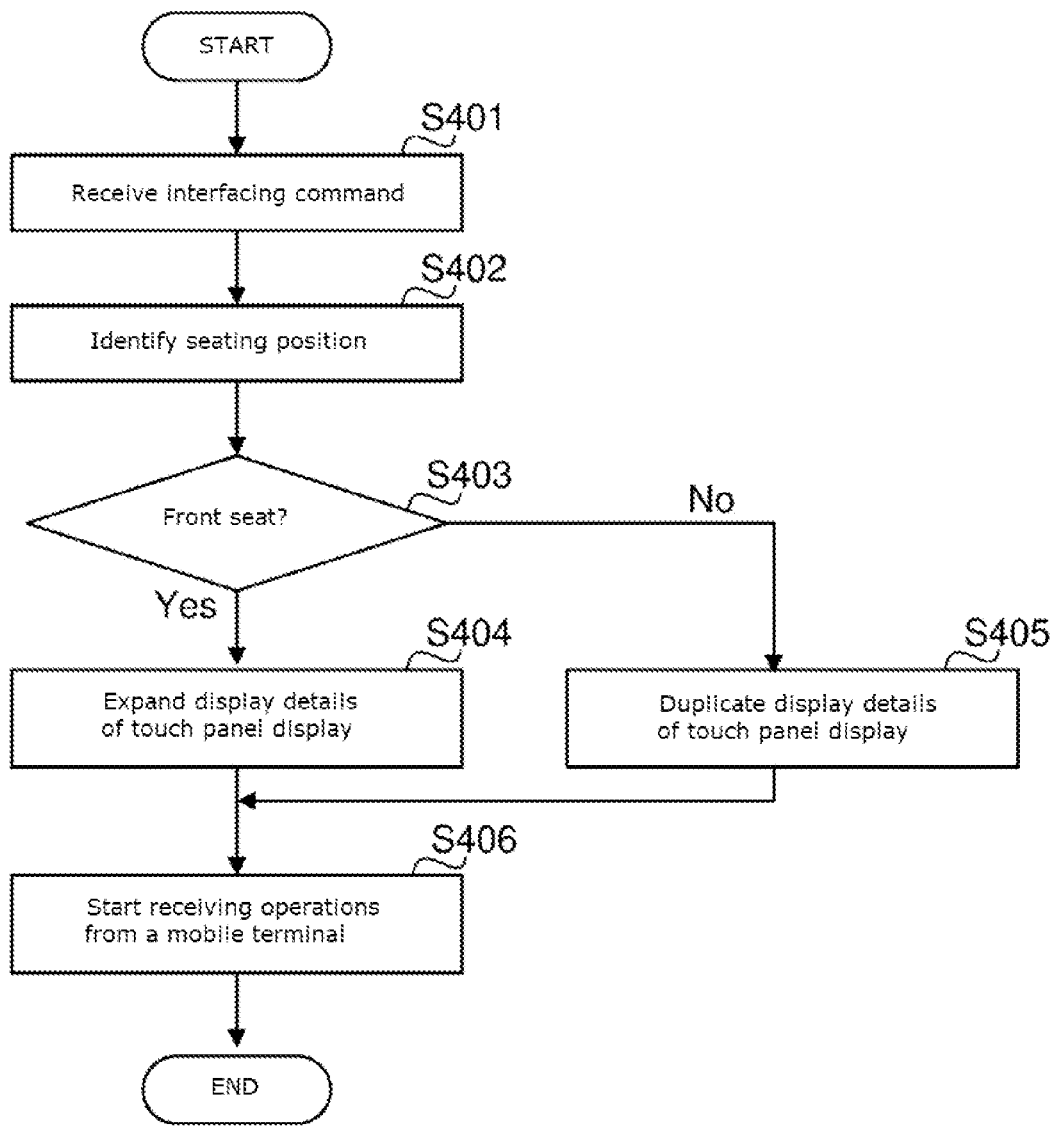
FIG. 14 is a flowchart showing interfacing steps.

FIG. 14 is a flowchart showing interfacing steps. First, the control unit 46 in the vehicle-mounted device 40 receives an interfacing command from a mobile terminal 30 (step S401). The control unit 46 then identifies the seating position (step S402). The seating position may be specified by receiving seating position data from the mobile terminal 30 or by referencing data received from a server 10. The vehicle-mounted device 40 may also specify the seating position by comparing a facial image with a vehicle interior image.

The control unit 46 determines whether or not the seating position is a front seat (step S403). If the seating position is a front seat (step S403; Yes), the control unit 46 expands the display details of the touch panel display 41 (step S404). If the seating position is not a front seat (step S403; No), the control unit 46 duplicates the display details of the touch panel display 41 (step S405). The control unit 46 provides expanded or duplicated display details to the mobile terminal 30, starts receiving operations from the mobile terminal 30 (step S406), and ends the process. Note that receiving operations from a mobile terminal 30 ends at a predetermined time, such as when an operation terminating the interfacing is received, when communication between the mobile terminal 30 and the vehicle-mounted device 40 is severed, or when power to the vehicle-mounted device 40 is turned off.

In the embodiment described above, the vehicle-mounted device 40 installed in the vehicle 20 comprises a mobile terminal communication unit 43 that communicates with a mobile terminal 30 located inside the vehicle, and a control unit 46 that provides an interface for operating the vehicle-mounted device 40 from the mobile terminal 30. The control unit 46 compares a vehicle interior image taken inside the vehicle interior with a facial image of the user of the mobile terminal 30 and changes the interface provided to the mobile terminal 30 based on the determined seating position of the user. This configuration and these operations make it possible to easily and accurately determine the position of a user in a vehicle interior and provide controls based on the position of the user. As a result, a user can automatically use the interface that is most suitable for their seating position.

The vehicle-mounted device 40 further comprises a touch panel display 41 serving as a display unit, wherein the control unit 46 causes the mobile terminal 30 to display expanded display details on the display unit if the seating position is in a front seat, and causes the mobile terminal 30 to display the same display details as those on the display unit if the seating position is other than one in a front seat. As a result, a user in a front seat can operate a mobile terminal 30 in conjunction with the touch panel display 41, and other users can operate a mobile terminal 30 instead of the touch panel display 41.

The vehicle-mounted device 40 can further comprise a server communication unit 44 that sends the vehicle interior image to a server 10, wherein the control unit 46 causes the server 10 to compare the vehicle interior image with a facial image of the user of the mobile terminal and changes the interface provided to the mobile terminal based on the determined seating position. In this configuration, a server 10 can be used to reduce the processing burden on the vehicle-mounted device 40 and reduce the cost of the vehicle-mounted device 40.

Also, the control unit 46 can compare a facial image of the user received from the mobile terminal 30 with the vehicle interior image to determine the seating position. In this configuration, the function of determining the seating position can be stably provided without depending on communication with a server 10.

An image taken by a camera in a drive recorder may be used as the vehicle interior image. In this configuration, existing equipment can be effectively utilized to provide controls based on the position of a user at low cost without requiring additional equipment.

In addition, the control unit 46 can change the interface provided to the mobile terminal 30 based on the seating position of the user and user information associated with the user. In this way, a user's history, characteristics, and registration information, etc. can be used to further enhance convenience.

Also disclosed is a server 10 comprising a communication unit 11 that communicates with a vehicle-mounted device 40 and a mobile terminal 30, a facial image managing unit 13$a$ that associates and manages a facial image of a user received from the mobile terminal 30 with identification information on the mobile terminal and identification information on the vehicle-mounted device, a facial recognition processing unit 13$b$ that performs facial recognition using the facial image and the vehicle interior image managed in association with received identification information on the vehicle-mounted device 40 when a vehicle interior image and identification information on the vehicle-mounted device are received from the vehicle-mounted device 40, and a seating position determining unit 13$c$ that determines the seating position from the position in the vehicle interior image and sets this as the seating position of the user of the mobile terminal associated with the facial image when a facial image matching the face of a person in the vehicle interior image is identified by the facial recognition processing unit 13$b$. This configuration and these operations make it possible to easily and accurately determine the position of a user in a vehicle interior and provide controls based on the position of the user.

Note that the present invention is not limited to the embodiment described above and that variations on these configurations and operations can be embodied. For example, in the configuration described above, a facial image was sent and stored in order to simplify the explanation, but feature values extracted from a facial image may also be sent and stored. Also, instead of sending an image of the entire vehicle interior, partial images corresponding to seating positions may be extracted and sent. In other embodiments, a center rear seat may be one of the seating positions, or there may be two rows of rear seats. Also, data indicating the correspondence between a vehicle interior image and the seating positions may be generated based on the vehicle or vehicle model, and stored in the vehicle-mounted device 40 or the server 10. In addition, the mobile terminal 30 may be used to capture and store a facial image of the user in advance. The vehicle-mounted device 40 may also be configured to communicate with the server 10 using the communication function of the drive recorder. The embodiment described above may be applied to interfacing with the display for the rear seats. In this case, the display is duplicated for the front seats and expanded for the rear seats.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

KEY TO THE DRAWINGS

10: Server
11: Communication unit
12: Memory unit
12a: Facial image management data
13: Control unit
13a: Facial image managing unit
13b: Facial recognition processing unit
13c: Seating position determining unit
20: Vehicle
30: Mobile terminal
31: Touch panel display
32: Mobile terminal camera
33: Vehicle-mounted device communication unit
34: Server communication unit
35: Memory unit
35a: Application program
35b: Mobile terminal ID
35c: Vehicle-mounted device ID
35d: Seating position data
36: Control unit
36a: Vehicle-mounted device connecting unit
36b: Facial image transmitting unit
36c: Command transmitting unit
40: Vehicle-mounted device
41: Touch panel display
42: Vehicle-mounted device camera
43: Mobile terminal communication unit
44: Server communication unit
45: Memory unit
45a: Vehicle-mounted device ID

The invention claimed is:

1. A vehicle-mounted device installed in a vehicle, comprising:
a mobile terminal communication unit that communicates with mobile terminals each accompanying its user located inside the vehicle; and
a control unit that provides the mobile terminals with screen interfaces for operating the vehicle-mounted device from the mobile terminals, the screen interfaces are displayed on the mobile terminals and contents of the screen interfaces are determined based on seating positions of the users;
wherein the seating positions of the users are identified by comparing a vehicle interior image of inside the vehicle captured by a camera connected to the vehicle-mounted device with preregistered facial images of the users of the mobile terminals.

2. The vehicle-mounted device according to claim 1, wherein a vehicle-mounted display is connected to the vehicle-mounted device;
wherein the control unit provides a first mobile terminal with the screen interfaces having contents that expand beyond the contents displayed on the vehicle-mounted display if the seat position of the user accompanied by the first mobile terminal is a front seat; and
wherein the control unit provides a second mobile terminal with the screen interfaces having the same contents as the contents displayed on the vehicle-mounted display if the seat position of the user accompanied with the second mobile terminal is a rear seat.

3. The vehicle-mounted device according to claim 1, further comprising a server communication unit that sends the vehicle interior image captured by the camera to a server and receives the seating positions of the users from the server;
wherein the server identifies the seating positions of the users by comparing the vehicle interior image with the preregistered facial images of the users of the mobile terminals.

4. The vehicle-mounted device according to claim 1, further comprising a memory unit that stores the preregistered facial images in association with the mobile terminals;
wherein the control unit receives a facial image through the mobile terminal communication unit and stores the received facial image as the preregistered facial image in the memory unit in association with the mobile terminal that sends the facial image; and
wherein the control unit identifies the seating positions of the users by comparing the vehicle interior image with the preregistered facial images in the memory unit.

5. The vehicle-mounted device according to claim 1, wherein the camera is a part of a drive recorder system, and the vehicle interior image is commonly used by the drive recorder system and the vehicle-mounted device.

6. The vehicle-mounted device according to claim 1, wherein the control unit determines the screen interfaces to provide the mobile terminals based on the seating positions of the users and user information associated with each of the users.

* * * * *